(12) United States Patent
Droz

(10) Patent No.: US 7,012,530 B2
(45) Date of Patent: Mar. 14, 2006

(54) ELECTRONIC LABEL

(75) Inventor: François Droz, La Chaux-de-Fonds (CH)

(73) Assignee: Nagrald S.A., La Chaux-de-Fonds (CH)

( * ) Notice: Subject to any disclaimer, the term of this patent is extended or adjusted under 35 U.S.C. 154(b) by 193 days.

(21) Appl. No.: 10/240,593

(22) PCT Filed: Apr. 11, 2001

(86) PCT No.: PCT/IB01/00607

§ 371 (c)(1),
(2), (4) Date: Oct. 3, 2002

(87) PCT Pub. No.: WO01/80173

PCT Pub. Date: Oct. 25, 2001

(65) Prior Publication Data

US 2003/0117336 A1    Jun. 26, 2003

(30) Foreign Application Priority Data

Apr. 18, 2000 (CH) ..................................... 0772/00
Nov. 3, 2000 (CH) ..................................... 2145/00

(51) Int. Cl.
*G08B 13/14* (2006.01)
(52) U.S. Cl. .............................. 340/572.6; 340/572.4; 340/572.7
(58) Field of Classification Search ............. 340/572.1, 340/572.4, 572.5, 572.6, 572.8; 235/375, 235/380, 449, 492; 73/24.06, 30.04; 324/633
See application file for complete search history.

(56) References Cited

U.S. PATENT DOCUMENTS

| | | | | |
|---|---|---|---|---|
| 5,587,578 A | * | 12/1996 | Serra | 235/492 |
| 5,920,290 A | | 7/1999 | McDonough et al. | 340/572.1 |
| 6,278,413 B1 | * | 8/2001 | Hugh et al. | 343/818 |
| 6,359,444 B1 | * | 3/2002 | Grimes | 324/633 |
| 6,397,661 B1 | * | 6/2002 | Grimes et al. | 73/24.06 |
| 6,535,108 B1 | * | 3/2003 | Schrott et al. | 340/10.1 |

FOREIGN PATENT DOCUMENTS

| | | |
|---|---|---|
| DE | 4401089 | 7/1995 |
| WO | 00/03354 | 1/2000 |
| WO | 00/25263 | 5/2000 |

* cited by examiner

*Primary Examiner*—Van T. Trieu
(74) *Attorney, Agent, or Firm*—Harness, Dickey & Pierce, P.L.C.

(57) ABSTRACT

One characteristic of electronic labels is that they can be read and written on without electrical contact through the communication coil (1). The reading heading is then positioned at some distance and communicates with the label through electromagnetic waves. When these labels are placed on metallic objects, reading becomes difficult even impossible because of the dispersion of the waves in the object. To overcome this drawback, the invention proposes the adding of an electromagnetic conductive element (3, 3') to the coil (1) in order to insulate it (1) and enhance the reception quality.

14 Claims, 1 Drawing Sheet

ELECTRONIC LABEL

FIELD OF THE INVENTION

This invention concerns the domain of electronic labels, more particularly labels designed to be placed on a metallic object.

BACKGROUND OF THE INVENTION

By electronic label one understands, a set having at least one support, an antenna and an electronic chip. This set can include several antennas or several chips according to the requirements. One finds them in the form of a button, in chip cards and even in luggage labels. Thanks to their antennas, they can communicate with a remote reader. The antenna serves not only as a means of communication, but also to produce the necessary energy to feed the electronic chip.

Some of these labels do not include electronic chips but passive components such as resistors or fuses. They are used to identify objects, for example in an anti-theft application.

According to the embodiments, the antenna is fitted to the flexible support or directly engraved or cut on this same support.

There are a lot of chips, which differ because of their functionalities, for example certain ones allow only the reading of information while others allow memorization and modification of their memory. The latter are used among other reasons for electronic cash card applications, which obviously need, a read/write feature in order to modify the contents according to the consumption of the user.

Another important application field is identification of the objects. In fact, in an automatic manufacturing cycle, it is indispensable than the automaton knows exactly which component it is in front of. The tendency in this kind of use is to replace the "bar-code" labels by labels equipped with an electronic chip. This not only allows identification of the object but also inversely allows the object to remember the manufacturing steps that it has been through.

Nevertheless, the problem that this kind of using comes from the nature of the object. In fact, these labels work according to the principle of a link by a magnetic field, they are disturbed by the proximity of a metallic mass absorbing the waves that allow communication.

In order to overcome this drawback, it is necessary to bring the label reader nearer to a distance of some millimeters to restore the communication.

In certain applications, one easily imagines that this distance constraint can present major drawbacks for objects having an angular outline for example.

There are solutions in which such a label comprises an electric conductive layer. There is for example the case in the document U.S. Pat. No. 5,920,290 where one of the executions describes a set of an antenna and a conductive sheet to create a resonant circuit. The aim of such a sheet, whose structure can also be obtained as well by metal coating as by carbon supplying, shows that the aim and the means to achieve this are far from the object of the present application.

Other documents describe the use of a conductive layer inside an electronic label that makes the necessary tracks for the routing of electric signals. There is the case in document WO00/03354 that is about the manufacturing of a TAG by assembling different layers. No mention of a magnetic reflector function is present in relation to these conductive layers.

Document WO00/25263 describes a protection method of a transponder against discharges of static electricity. This protection is achieved with a sheet of semiconductor material placed on a section of the coil. With its structure, it forms a diode limiter between the turns of the coil. Otherwise said, this sheet constitutes a filter in charged to eliminate parasitic signals created by static discharge or electromagnetic disturbances which could harm the good work of the transponder. Such a semiconductor sheet cannot thus in any case be magneto reflective because its role is limited, on the contrary, to reducing or to absorbing undesirable electromagnetic signals. By the way, this document does not mention electromagnetic field reflection by a component of the transponder or possible problems caused by the support where this transponder would be applied.

SUMMARY OF THE INVENTION

The aim of this invention is to propose an electronic label whose reading distance is distinctly improved in order to allow a less accurate placement of the readout head.

This aim is achieved by an electronic label comprising at least one electronic component and an antenna in the form of a generally flat coil assembled on a generally planar substrate, the label arranged to be read by a reader which transmits an electromagnetic field towards at least one face of the label, which the label includes at least one magneto reflective element constituted by an electro-magnetic conductive sheet independent of the electronic component and the coil, said sheet, being placed under the coil on a side opposite of a transmitting face of the reader, reflects the electromagnetic field emitted by the reader preventing dispersion of said field in the support whereon the label is applied.

By electronic component one understands either an electronic chip, or a passive component such as a fuse or a resistor.

The magneto reflective element is placed on the opposite side of the reader transmission side. With the presence of this element, the magnetic field is let say reflected against the reader instead of being dispersed in the metallic object.

The position and shape of the element play an important role.

In a variant of the invention, the magneto reflective element is disposed in the form of a sheet sensibly at the same size than the coil. The distance between the coil and the sheet is determined to obtain the optimal researched characteristics.

According to another embodiment, the sheet exceeds slightly the surface of the coil, creating an edge effect, which allows the magnetic field to be captured and thus increases the acceptable reading distance.

The testing has shown that the shape and distance of the sheet are determined in function of the characteristics of the label, in particular of the transmission frequency. Thanks to this magnetic sheet, it is possible to read a label placed on a metallic part at an acceptable distance for this kind of application.

This sheet can have non-planar geometric shapes, for example it can go over the rim of the coil. According to the requirements, this sheet can include openings whose shape is determined by the researched magnetic characteristics.

This sheet can be directly placed under the coil or at a predetermined distance, for example by means of an insulating layer.

BRIEF DESCRIPTION OF THE DRAWINGS

The invention will be better understood thanks to the following detailed description referring to the attached drawings given as a non-limiting example.

DETAILED DESCRIPTION OF EXAMPLE EMBODIMENTS OF THE INVENTION

Figure 1:
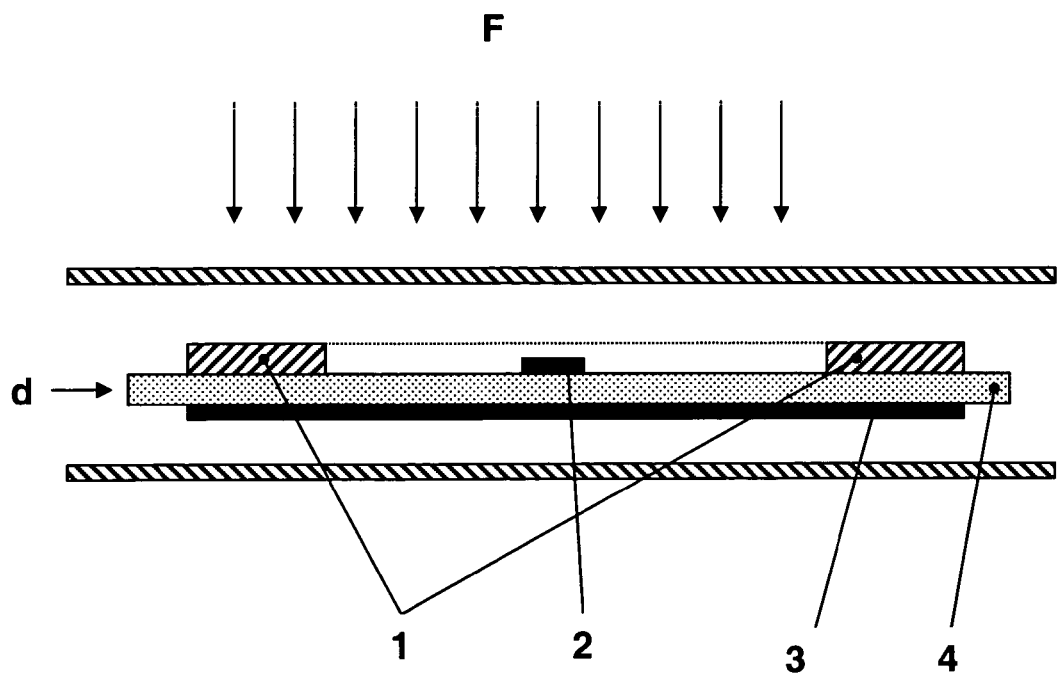
FIG. 1 represents an electronic label with a protection sheet according to the invention.

In FIG. 1, representing a section of an electronic label, one can distinguish the schematized coil 1 as well as the electronic chip 2. Note that although this chip is situated inside the coil, it also can be situated outside the surface defined by the coil.

Under the coil 1, is placed the magneto reflective sheet 3 separated by an insulating layer 4 and defining the distance between the coil and the magnetic sheet. The presence of this insulating layer is not necessary to obtain the desired effect; the magneto reflective sheet can be directly applied onto the coil.

This sheet 3 is placed on the opposite side of the reader (schematized by field lines F), that is to say on the application side of the label on the object having metallic characteristics.

This set can be embedded in a resin or encapsulated between two protection sheets. The shape of this label can be any as a card, a button, or mounted on a flexible support.

Figure 2:
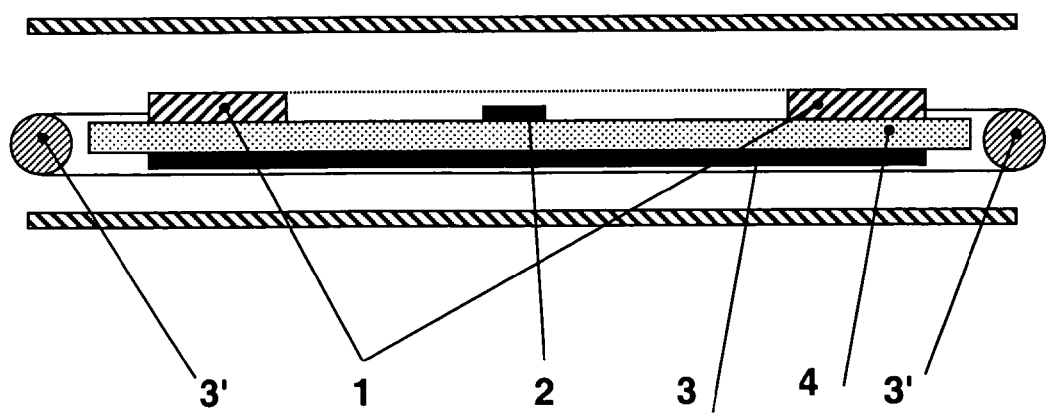
FIG. 2 represents an electronic label with a magnetic protection ring and a matgnetic protection sheet.

According to a variant of the invention, shown in FIG. 2, the magneto reflective sheet can have other shapes to be placed only on the periphery of the coil. This element can be made in the form of a ferrite ring 3' for example or made as a magnetically conductive mechanically stamped sheet whose center would contain the coil.

The effect of magnetic flux concentrator also operates if the magnetic element is not placed under the coil but on its nearby periphery. For this purpose, it is useful to note that it is not necessary that the magnetic element surrounds the whole periphery of the coil. Positive results have been observed using such an element on only one section of the periphery of the coil.

This embodiment does not exclude the use of a magnetic sheet such as the one previously described placed under the coil in addition to the peripheral element. Furthermore it is possible to make a single piece with these two parts.

What is claimed is:

1. An electronic label comprising at least one electronic element component and an antenna in the form of a generally flat coil assembled on a generally planar substrate, the label arranged to be read by a reader which transmits an electromagnetic field towards at least one face of the label, wherein
the label includes at least one magneto reflective element constituted by an electro-magnetic conductive sheet independent of the electronic component and the coil, said sheet, placed under the coil on a side opposite of a transmitting face of the reader, reflects the electromagnetic field emitted by the reader preventing dispersion of said field in the support whereon the label is applied.

2. The electronic label according to claim 1, wherein the magneto reflective sheet covers all or part of the surface of the coil.

3. The electronic label according to claim 1, wherein the magneto reflective sheet is slightly larger than the surface of the coil.

4. The electronic label according to claim 1, wherein the magneto reflective sheet includes three-dimensional shapes.

5. The electronic label according to claim 1, wherein the magneto reflective sheet comprises one or several openings on its surface.

6. An electronic label comprising at least one electronic component and an antenna in the form of a generally flat coil assembled on a generally planar substrate, the electronic label arranged to be read by a reader which transmits an electromagnetic field towards at least one face of the electronic label, wherein
the label includes a magneto reflective element constituted by an electro-magnetic conductive element independent of the electronic component and the coil, said electro-magnetic conductive element, placed on all or a portion of a periphery of the coil, reflects the electromagnetic field emitted by the reader preventing dispersion of said field in the support whereon the label is applied.

7. The electronic label according to claim 6, wherein said electro-magnetic conductive element forms a ring in ferrite material surrounding the coil.

8. The electronic label according to claim 6, wherein said electro-magnetic conductive element is stamped out from an electro-magnetic conductive sheet, the coil being placed in a central area of said electro-magnetic conductive element.

9. The electronic label according to claim 6, wherein the magneto reflective element comprises an additional part constituting a sheet covering all or part of the surface of the coil, said sheet being placed under the coil on a side opposite of a transmitting face of the reader.

10. The electronic label according to claim 9, wherein said sheet is larger than the surface of the coil.

11. The electronic label according to claim 9, wherein said sheet includes three-dimensional shapes.

12. The electronic label according to claim 9, wherein said sheet comprises one or several openings on its surface.

13. The electronic label according to claim 9, wherein the electro-magnetic conductive element, placed on all or a portion of the periphery of the coil and the sheet being placed under the coil on a side opposite of a transmitting face of the reader, constitute together a single piece.

14. An electronic label comprising at least one electronic component and an antenna in the form of a generally planar coil assembled on a generally planar substrate, the electronic label arranged to be read by a reader which transmits an electromagnetic field towards at least one face of the electronic label, wherein
the label includes a magneto reflective element constituted by an electro-magnetic conductive element independent of the electronic component and the coil, said electro-magnetic conductive element, placed on all or a portion of a periphery of the coil, reflects the electromagnetic field emitted by the reader preventing dispersion of said field in the support whereon the label is applied.

* * * * *